Dec. 31, 1968  J. J. MEYERHOFFER  3,418,797
MECHANICAL NUT AND FRUIT PICKER
Filed July 12, 1965  Sheet 2 of 3

INVENTOR.
Joseph J. Meyerhoffer
BY
Robert A. Halvorsen

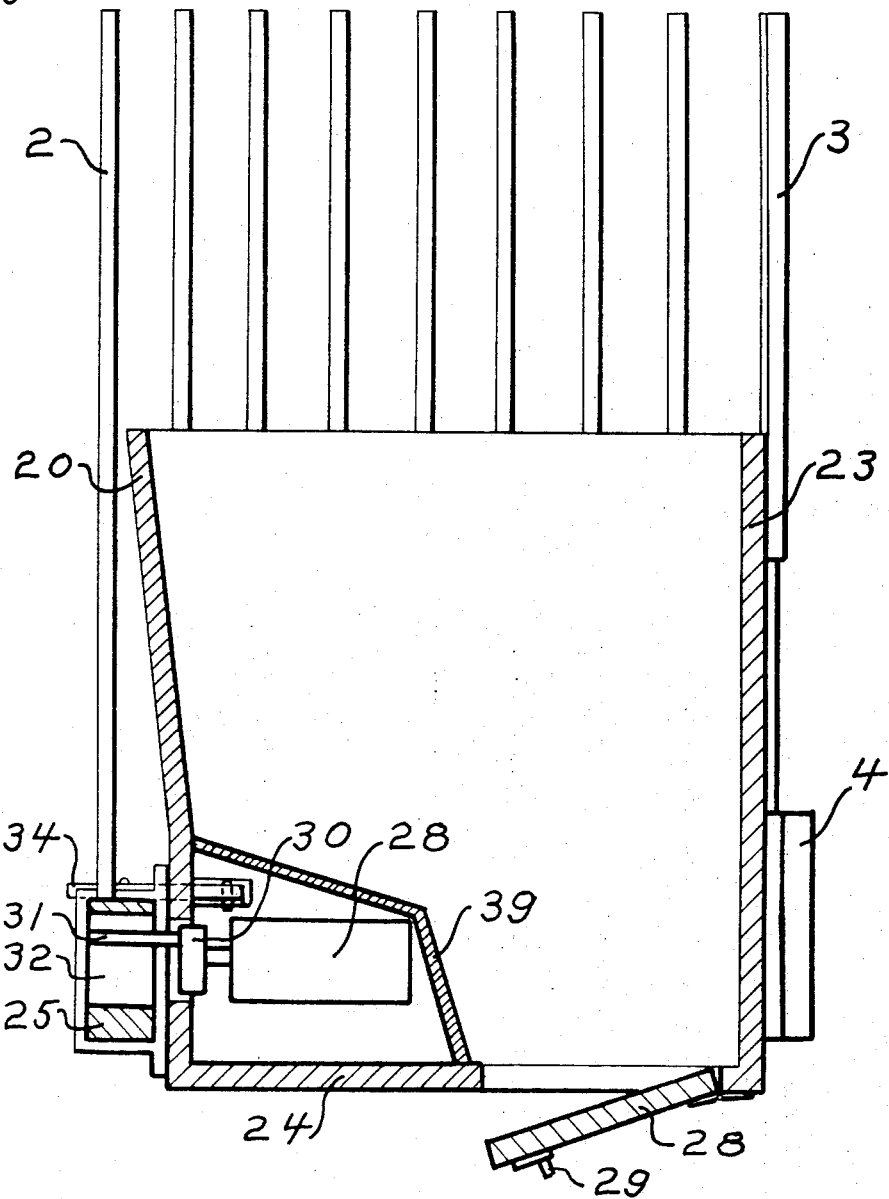

United States Patent Office 3,418,797
Patented Dec. 31, 1968

3,418,797
MECHANICAL NUT AND FRUIT PICKER
Joseph J. Meyerhoffer, 4209 S. Trail,
Sarasota, Fla. 33579
Filed July 12, 1965, Ser. No. 471,068
5 Claims. (Cl. 56—328)

ABSTRACT OF THE DISCLOSURE

A device for picking fruit incorporating a fruit container attached to which are series of projecting fingers and means for rapidly reciprocating said series of fingers.

This invention relates to machines used in commercial groves to pick nuts, oranges, apples and even tender-fleshed fruits like pears and cherries.

Such machines as have been heretofore used for such operations have frequently bruised the fruit, or injured the small branches of the tree or have left an excessive percent of the fruit unpicked. Other machines have been so costly to build and maintain as to preclude their economic use. Still other machines have been so large that their passage between the rows of trees has been impeded by the branches projecting from mature trees.

A major object of this invention is to provide a fruit picking machine which will more gently and more completely pick nuts and fruit from trees.

Another object is to provide such a machine, utilizing commercially available components to a large extent.

A further object is to provide a machine which can with relative ease be converted for use with various types of nuts and fruits.

Another object is to provide a fruit picking machine which can be operated by one man and which can deposit the picked fruit in a self-loading receptacle which is removably attached to the picker.

Other objects will be apparent to one skilled in the art from a study of the following description and drawings in which:

FIGURE 4 is a detailed section view across the width of the container, at its midpoint.

Figure 1:
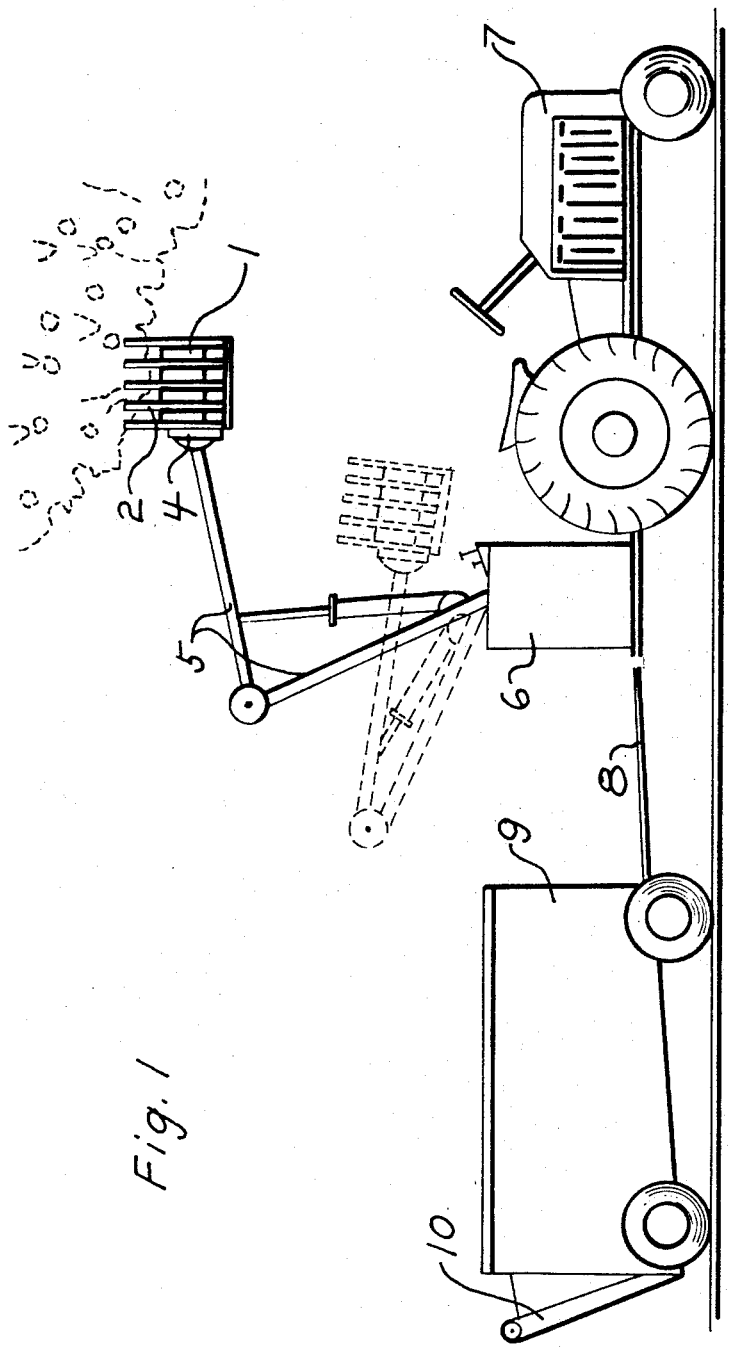
FIGURE 1 is a general view showing the arrangement of major elements of the combination.
Figure 2:
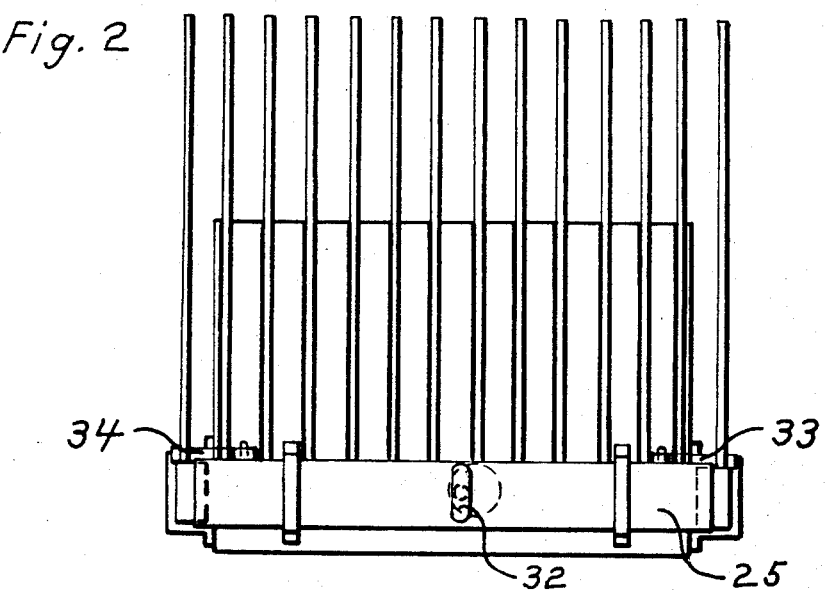
FIGURE 2 is a front view showing the fruit picking container, taken across the length of the container.

In the drawings, where like numerals refer to similar parts, 1 represents generally a fruit container having rectangular sides, with picking fingers 2 extending upwardly from the front and sides of said container, and fruit retaining fingers 3 projecting upwardly from the back.

This fruit container is attached by a swivel flange 4 to a conventional series of hydraulically actuated arms 5 which are attached to a power source 6 mounted for rotation in a horizontal plane at the rear of a conventional farm tractor 7.

Connected to the draw-bar of said tractor by a towing bar 8 is a wheeled trailer 9 having sides 10 about five feet high, and about four feet wide to permit travel between rows of trees.

At the rear of trailer 9 is a conveyor 10, preferably of the endless belt type, to move fruit deposited in said trailer 9 by container 1, upwardly into a conventional semi-trailer for transport over the highways.

Figure 3:
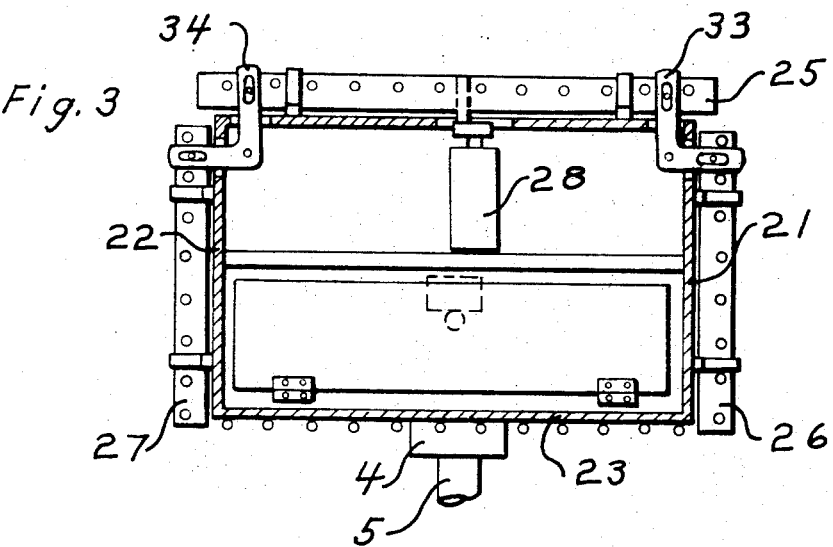
FIGURE 3 is a detailed cross section view taken as shown at A—A in FIGURE 2.

Describing in more particular detail container 1, FIGURES 3 and 4 show a front wall 20, sides 21 and 22, a back 23, and a bottom 24. Said container is for usual use proportioned about 28" long, 18" wide and 18" deep.

Supported by the front and sides for vibration in the range of ¼" to 1" stroke, and 500 to 2000 cycles per minute are three finger-supporting bars 25, 26 and 27.

The fingers need not, except for unusually delicate fruit, be covered with a resilient material, but preferably are made of tempered steel round bars, ½ inch diameter, projecting from between 6 inches to 18 inches above the top edges of container 1.

Similar, nonreciprocating fingers are provided above the back edge of the container to prevent fruit from escaping from the container when it is tilted and quickly moved in the picking operations.

The power to reciprocate the picking fingers is preferably provided by an hydraulic motor 28 mounted within said container and preferably shielded from contact with fruit by an inclined sheet 39.

I do not intend to be bound to the particular means shown for the reciprocation of bars 25, 26, and 27, but illustrative purposes show as the preferred embodiment an eccentric 30 driven by motor 28 which through pin 31 fitted within vertical slot 32 is bar 25 causes the horizontal reciprocation of bar 25.

The movement of bar 25 is transmitted through bell cranks 33, 34, which are each pivotally mounted in container 1, to side bars 26 and 27 by means of pins projecting from said bell cranks which fit within suitable slots in side bars 25, 26 and 27.

While I have described the preferred means of vibrating fingers 2, it should be apparent that it is the vibration of fingers 2 relative to the branches of the tree which is of functional importance. Thus the picking action of the device could be achieved by vibration of the entire container with fingers rigidly attached thereto, or the entire individual sides and ends of the container could be vibrated and achieve similar picking action. Such arrangements however are more expensive to construct, to energize and to maintain than the preferred embodiment heretofore described.

One desirable feature of this invention is that the device can easily be converted for use in picking large grapefruit to small pecan nuts by changing the bars 25, 26, 27 with widely spaced fingers to alternate bars with closely spaced fingers, and also by changing eccentric 30 to provide a shorter or longer reciprocating stroke as is found most effective on the particular crop being picked.

A hinged door 28 is shown at the bottom of container 1, which is normally held in closed position by latch 29, but may be opened by pulling a cord attached to latch 29 to discharge fruit from container 1 into trailer 9. Alternately said door 28 may be mounted for opening and closing by conventional hydraulic mechanisms. It is also sometimes practical to construct container 1 without the hinged door 28, in which case container 1 is emptied by rotating it to an inverted position by swivel flange 4.

Details beyond those indicated at 5, 6 of the machine utilized for the support and movement of container 1 are not shown, as any conventional mobile unit may be utilized which permits controlable movement in the bucket in all directions. Such units are customarily actuated by hydraulic pumps, cylinders, valves and motors and are too well known to require further description.

It is also deemed unnecessary to show further details in the fruit-containing trailer 9 since such trailers provided with unloading means are well known in the art.

In the operation of this device, the tractor 7 is driven to a location adjacent to a tree or trees, and stopped.

The hydraulic power source is energized, preferably by an independent gasoline engine, and the operator by manipulation of a series of hydraulic valves causes the arms 5 to move container 1 under a fruit bearing portion of the tree. Hydraulic motor 28 is energized, so that the projecting fingers at the front and sides of the bracket rapidly reciprocate through a short stroke. Container 1 is then moved generally upwardly through the branches, picking the fruit off the small branches by a combing action of the reciprocating fingers.

It often is more convenient to pick fruit with the fingers attached to the sides of container 1 rather than with those along the front edge. The provision of the vibrating motion to the fingers at the sides makes this practical, and substantially reduces the time required to pick the fruit from a tree.

When the device is stationed centrally between four adjacent trees, fruit will first be picked from as large a portion of one tree as may be conveniently reached by the container 1 by manipulation of arms 5 and swivel flange 4. Adjacent trees are thereafter similarly picked in sequence, and the tractor is moved forwardly to pick other portions of the same and other trees only after a substantial portion of the first four trees has been picked. This sequence of operations results in most efficient use of the device and the time of the operator.

It has been found that the rapid vibrations, of relatively small amplitude, of the picking fingers 2 are to a large degree imparted to the small fruit bearing twigs before contacts of the fruit by the fingers. These vibrations cause most varieties of fruits to quickly drop off the stems into container 1.

Certain fruits, like apples, however, do not readily drop from their stems. In such instances it has been found effective to provide conventional fixed triangular cutter blades to the upper front and side edges of container 1, and corresponding reciprocating triangular cutter blades attached to the vibrating fingers 2 adjacent said fixed blades to cut off small fruit bearing twigs.

The transfer of fruit from container 1 into trailer 9, and the elevation of the fruit by conveyor 10 into large highway trucks is conventional, and it is not deemed necessary to more particularly describe such procedures.

I claim as my invention:

1. In a device for picking nuts and fruits, a container having a generally rectangular bottom and four upstanding sides, a series of spaced fingers projecting above each of said sides, each said series being so attached to its side as to permit relative movement between said side and said series, power means for causing rapid reciprocation of one of said series, and mechanical linkages to transmit said repicrocation to another series of fingers, said mechanical linkages comprise a bell crank mounted to pivot on said container and being connected at its one outer end to a first series of spaced fingers and at the other outer end to a second series of spaced fingers perpendicular to said first series.

2. In a device as defined by claim 1, wherein said bottom supports a hydraulic motor and has a hinged door and a latch to permit the discharge of materials from said container while it is in an upright position.

3. In a device as defined by claim 1, wherein said bottom supports a hydraulic motor and has a hinged door and a latch to permit the discharge of materials from said container while it is in an upright position, said container being connected by means of a swivel to a series of hydraulically actuated supporting arms which are mounted for transport upon a conventional motor vehicle.

4. In a device as defined by claim 1, wherein said bottom supports a hydraulic motor and has a hinged door and a latch to permit the discharge of materials from said container while it is in an upright position, said container being connected by means of a swivel to a series of hydraulically actuated supporting arms which are mounted for transport upon a conventional motor vehicle, said conventional motor vehicle being attached by a draw-bar to a trailer adapted to transport fruit deposited therein from said container.

5. In a device as defined by claim 1, wherein said bottom supports a hydraulic motor and has a hinged door and a latch to permit the discharge of materials from said container while it is in an upright position, said container being connected by means of a swivel to a series of hydraulically actuated supporting arms which are mounted for transport upon a conventional motor vehicle, said conventional motor vehicle being attached by a draw-bar to a trailer adapted to transport fruit deposited therein from said container, said trailer having means for conveying fruit from its interior to an outside elevated position.

References Cited

UNITED STATES PATENTS

| | | | |
|---|---|---|---|
| 2,586,834 | 2/1952 | Kreisman | 56—328 |
| 3,023,565 | 3/1962 | McKibben et al. | 56—330 |
| 3,077,720 | 2/1963 | Grove et al. | 56—328 |

ABRAHAM G. STONE, *Primary Examiner.*

P. A. RAZZANO, *Assistant Examiner.*

U.S. Cl. X.R.

56—130